United States Patent
Aabye et al.

(10) Patent No.: US 10,430,785 B2
(45) Date of Patent: *Oct. 1, 2019

(54) PREPAID CHIP CARD EXCEPTION PROCESSING

(71) Applicant: VISA INTERNATIONAL SERVICE ASSOCIATION, San Francisco, CA (US)

(72) Inventors: Christian Aabye, Morgan Hill, CA (US); David William Wilson, Surrey (GB)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 222 days.

This patent is subject to a terminal disclaimer.

(21) Appl. No.: 15/146,759

(22) Filed: May 4, 2016

(65) Prior Publication Data

US 2016/0247146 A1  Aug. 25, 2016

Related U.S. Application Data

(63) Continuation of application No. 12/428,190, filed on Apr. 22, 2009, now Pat. No. 9,390,406.
(Continued)

(51) Int. Cl.
*G06Q 20/34* (2012.01)
*G06Q 20/06* (2012.01)
(Continued)

(52) U.S. Cl.
CPC ....... *G06Q 20/342* (2013.01); *G06Q 20/0655* (2013.01); *G06Q 20/105* (2013.01);
(Continued)

(58) Field of Classification Search
None
See application file for complete search history.

(56) References Cited

U.S. PATENT DOCUMENTS 5,264,689 A * 11/1993 Maes ................. G06Q 20/3433
235/375
6,122,625 A 9/2000 Rosen
(Continued)

FOREIGN PATENT DOCUMENTS

| KR | 10-2004-0017396 | 2/2004 |
| KR | 10-2004-0073779 | 8/2004 |
| KR | 10-2006-0063026 | 6/2006 |

OTHER PUBLICATIONS

U.S. Appl. No. 12/428,181 filed Apr. 22, 2009, 40 pages.
(Continued)

*Primary Examiner* — Nathan C Uber
*Assistant Examiner* — Denisse Y Ortiz Roman
(74) *Attorney, Agent, or Firm* — Kilpatrick Townsend & Stockton LLP

(57) ABSTRACT

A portable consumer device may have money stored therein, which can be calculated using an accumulator record and an exception record. The accumulator record can be incremented by the amount of any initiated transaction using the portable consumer device. The exception record can be incremented by the amount of any completed transaction using the portable consumer device. The portable consumer device may also have a limit amount, to record the amount of money added. The records allow for a later reconstruction of the device history, and can account for any errors or problems during transactions.

14 Claims, 6 Drawing Sheets

Related U.S. Application Data

(60) Provisional application No. 61/046,973, filed on Apr. 22, 2008.

(51) Int. Cl.

| | | |
|---|---|---|
| *G06Q 20/10* | (2012.01) | |
| *G06Q 20/22* | (2012.01) | |
| *G06Q 20/26* | (2012.01) | |
| *G06Q 20/36* | (2012.01) | |
| *G06Q 20/38* | (2012.01) | |
| *G07F 7/08* | (2006.01) | |
| *G06Q 40/00* | (2012.01) | |

(52) U.S. Cl.
CPC .......... *G06Q 20/227* (2013.01); *G06Q 20/26* (2013.01); *G06Q 20/348* (2013.01); *G06Q 20/363* (2013.01); *G06Q 20/389* (2013.01); *G06Q 40/12* (2013.12); *G07F 7/0866* (2013.01)

(56) References Cited

U.S. PATENT DOCUMENTS

| | | |
|---|---|---|
| 6,805,289 B2 | 10/2004 | Noriega |
| 2004/0063494 A1* | 4/2004 | Oram .................. A63F 13/12 463/42 |
| 2004/0210519 A1 | 10/2004 | Oppenlander et al. |
| 2007/0069006 A1 | 3/2007 | Holmes et al. |
| 2007/0121489 A1 | 5/2007 | Roth et al. |
| 2007/0192178 A1 | 8/2007 | Fung et al. |
| 2008/0065492 A1 | 3/2008 | Halbur et al. |
| 2010/0197383 A1 | 8/2010 | Rader et al. |

OTHER PUBLICATIONS

Office Action dated Mar. 18, 2011, U.S. Appl. No. 12/428,181, 11 pages.

Search/Examination Report, dated Nov. 13, 2009, International Application No. PCT/US2009/041412, 18 pages.

Notice of Allowance, dated Mar. 8, 2016, U.S. Appl. No. 12/428,190, 7 pages.

Final Office Action, dated Jan. 30, 2015, U.S. Appl. No. 12/428,190, 6 pages.

Non-final Office Action, dated Oct. 20, 2014, U.S. Appl. No. 12/428,190, 4 pages.

Non-final Office Action, dated May 28, 2014, U.S. Appl. No. 12/428,190, 13 pages.

Final Office Action, dated Sep. 13, 2011, U.S. Appl. No. 12/428,190, 12 pages.

Non-final Office Action, dated Feb. 9, 2011, U.S. Appl. No. 12/428,190, 9 pages.

Restriction Requirement, dated Dec. 2, 2010, U.S. Appl. No. 12/428,190, 6 pages.

* cited by examiner

PREPAID CHIP CARD EXCEPTION PROCESSING

CROSS-REFERENCES TO RELATED APPLICATIONS

This patent application is continuation of and claims priority to U.S. application Ser. No. 12/428,190 filed on Apr. 22, 2009 which is a non-provisional of and claims priority to U.S. provisional patent application No. 61/046,973, filed on Apr. 22, 2008, which is herein incorporated by reference in its entirety for all purposes.

BACKGROUND

A number of payment methods and systems exist. For example, prepaid cards, such as prepaid or preauthorized debit cards, can be a convenient method for consumers to conduct transactions, such as payment transactions. Such prepaid cards can include a memory that stores a balance, and any purchases using the card can be deducted from the balance. Prepaid cards have advantages in that the funds (or more precisely data representing funds) are stored directly on the card, so that a merchant will not always need to communicate with a bank to determine if the consumer has enough money for the transaction. The card can use a counter to keep track of how much has been spent, until the funds on the card reach zero (i.e., all the money has been spent). A "counter" is a record of the amount of money spent using the prepaid card. Often times, extra funds can be added to a card. If this happens, the counter can be reset to zero dollars upon reloading of the prepaid card with value, so that the card will appear to not have spent any of its stored funds.

Since prepaid cards can maintain the balance directly on the card, such cards can be used to make purchases without having to communicate with an associated bank or other financial institution, as in the case of a credit card. This can speed up transactions and save costs. However, the financial institution necessarily must relinquish a degree of control over such offline transactions. Multiple transactions (i.e., 2 or more) can be conducted with a prepaid card before the financial institution is aware of the transaction.

There can often be an exception during a transaction. An exception is any of a number of scenarios in which a transaction has an error. For example, funds may be deducted from the portable consumer device during an attempted transaction, but the POS device or financial institution system does not receive a record of the deduction. Thus, the information in the financial institution system does not match the information in the portable consumer device. Such exception scenarios may be familiar to any consumer who has dealt with broken cash registers, temporarily disabled communication networks, etc. During offline transactions, the financial institution may not get the opportunity to use fraud detection measures. Multiple exceptions may occur before a financial institution determines that a portable consumer device contains incorrect data, by which point it may be difficult to unravel where the problems occurred or the amount of funds affected.

Embodiments of the invention address the above-noted problems, and other problems, individually and collectively.

BRIEF SUMMARY

Embodiments of the invention include portable consumer devices, and systems and methods for performing a transaction and updating a portable consumer device.

One embodiment is directed to a portable consumer device for use in transactions. The portable consumer device comprises a communications element configured to communicate with an access device during a transaction, and a memory element, the memory element including an accumulator record and an exception record, wherein the accumulator record is configured to be incremented upon the initiation of the transaction, and further wherein the exception record is configured to be incremented upon the completion of the transaction.

Another embodiment is directed to a method for processing a transaction with a portable consumer device, the transaction having a value, the method comprising determining a value for the transaction, determining, using a processor, the value of an accumulator record stored in a memory of the portable consumer device, incrementing, using the processor, the accumulator record by the value of the transaction, determining, using the processor, the value of an exception record stored in a memory of the portable consumer device, and incrementing, using the processor, the exception record by the value of the transaction.

Another embodiment is directed to a computer readable medium for managing a portable consumer device, the computer readable medium comprising code for maintaining a shadow account for the portable consumer device, the shadow account comprising a shadow accumulator record, wherein the shadow accumulator record retains the value for each initiated transaction in the portable consumer device transaction history, and a shadow exception record, wherein the shadow exception record retains the value for each completed transaction in the portable consumer device transaction history.

These and other embodiments of the invention are described in further detail below with reference to the drawings and the Detailed Description.

DETAILED DESCRIPTION

Figure 1:
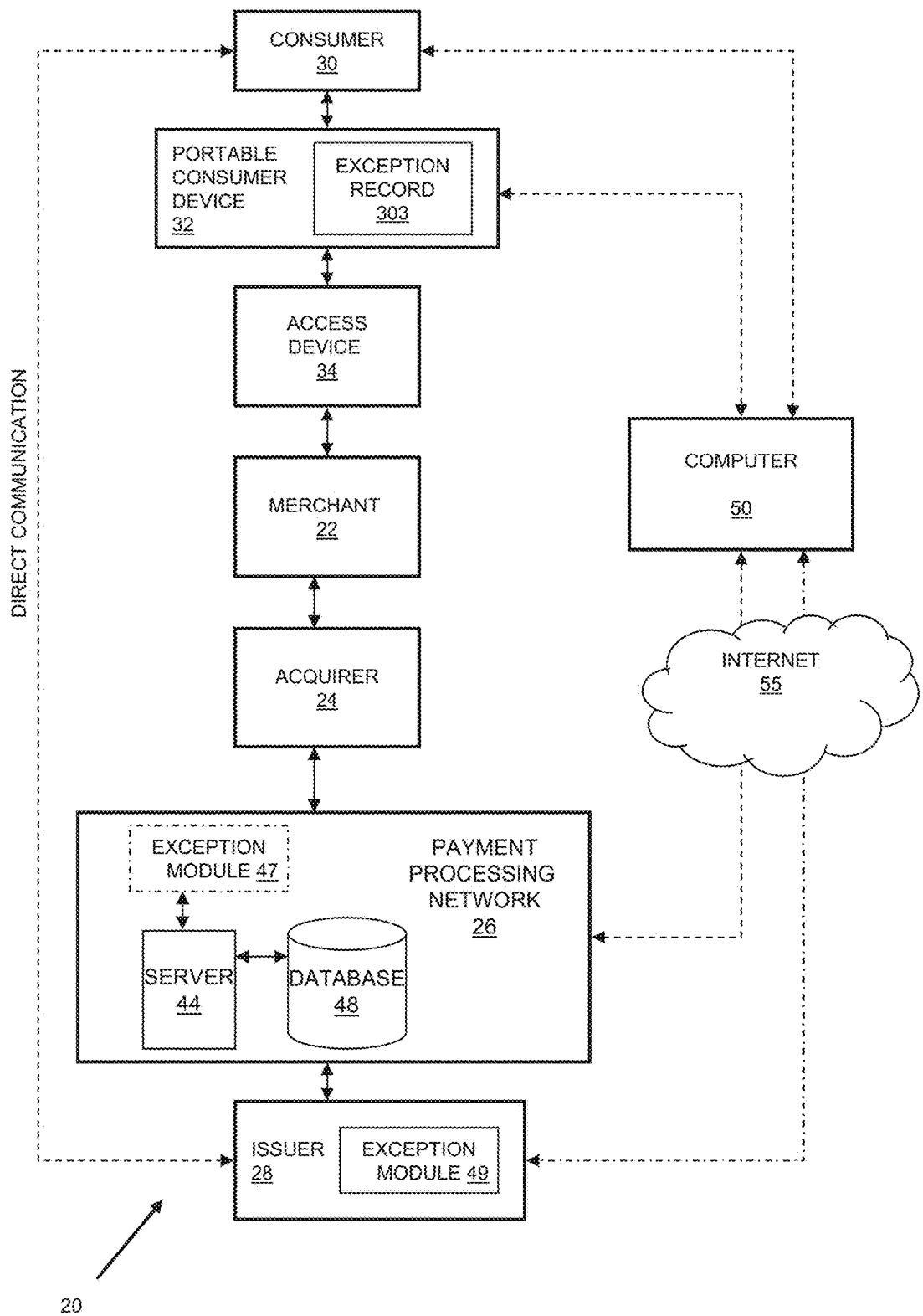
FIG. 1 is a block diagram of a system according to an embodiment of the invention.

Embodiments described herein relate to portable consumer devices, and systems and methods of using such devices. An example of a portable consumer device can be a prepaid card issued by a bank and used by consumers to make purchases of goods or services. The prepaid card can include a memory element such as a flash memory (or other non-volatile memory), and a communication element such as an antenna. The flash memory can store a balance for the prepaid card. In exemplary embodiments, the card can retain a record of each transaction that it has engaged in (e.g., a cumulative record). The card can retain a record of both the transactions that have been initiated (e.g. costs tallied and payment method has been selected), and a record of the transactions that have completed (e.g. funds have been authorized for payment and goods/services have been received). By maintaining two separate records, the bank can easily determine if there have been any unfinished transactions or other issues with the prepaid card. In some embodiments, these records may never be reset, which allows for lifetime tracking of the card's transaction history, and greater fraud and error prevention, as will be explained in greater detail below.

In exemplary embodiments, a consumer may receive and use a prepaid card. To receive a prepaid card, the consumer may provide money (from a credit card account, bank account, cash, etc) to a financial institution such as a bank. The bank can then issue to the consumer a prepaid card, which can have a balance stored on a memory in the card. The balance can represent the amount of money that is "stored" on the prepaid card and can be used in transactions. These transactions may be "offline" in that they can be conducted without communicating with the bank. Thus the balance can be an "offline balance". The balance may be for the entire amount of money the consumer originally provided to the bank, or may be such amount less any fees charged by the bank, etc.

In exemplary embodiments, the prepaid card memory element can contain at least three separate records—a "limit amount," an "accumulator record," and an "exception record." The prepaid card can record the balance by adjusting the limit amount or the accumulator record. The first record, a limit amount, can be a number representing the upper limit of the balance of the card. When funds are transferred to the prepaid card, the value of the limit amount can be increased to reflect the transfer. In the above example, the consumer may give $50 U.S. to the bank to put on the prepaid card. Thus, the limit amount would be set to 50 dollars.

Another record is the accumulator record. This record can be a number that reflects all past initiated transactions involving the prepaid card. A transaction can be initiated when the prepaid card is first read by a point of sale (POS) device of the merchant. The POS device can read the data stored on the prepaid card to see if the prepaid card has enough funds for the transaction. Concurrently (or soon after the data is read), the value of the accumulator record can be incremented by the amount of the transaction, as will be explained in greater detail below. The remaining balance on the card can be the difference between the limit amount and the accumulator record. In the above example, the prepaid card has not been used in any transactions when it is first received by the consumer, so the accumulator record would be set to 0. Therefore, the balance on the prepaid card would be 50 dollars, which is the difference between the limit amount and the accumulator record (50−0=50). Upon the initiation of a transaction, the accumulator record may be incremented by the amount of the transaction. For example, a consumer may initiate a transaction to purchase 30 dollars worth of groceries. The merchant's POS device can read the portable consumer device, to determine if there is at least 30 dollars of funds stored therein. In certain embodiments, the portable consumer device can determine if there is at least 30 dollars of funds stored therein. When the POS device reads the prepaid card, the accumulator record can be incremented by 30 dollars, to record that the transaction has been initiated.

The memory element can also include data for an exception record. The exception record can be similar to the accumulator record, in that both records can reflect past transactions. In certain embodiments, the exception record can be a number that reflects all successful, or completed, past transactions involving the prepaid card. In some implementations, the value of the exception record can be incremented by the amount of the transaction, once the transaction has been completed or approved. Thus, the exception record can be used for error correction of any data stored on a card. Embodiments disclosed herein contemplate a portable consumer device that maintains a separate record for both initiated and completed transactions. This can allow the bank to determine when transactions were started but not finished, and to reconstruct events that lead to exception scenarios, as will be described in greater detail below.

The consumer can use the prepaid card to conduct transactions to purchase goods from a merchant. As in the above example, a consumer may wish to purchase 30 dollars worth of groceries from a merchant such as a grocery store (i.e., a grocer). To conduct a transaction, the consumer can present the prepaid card described above to the grocer. The prepaid card can determine that the balance is 50 dollars. The accumulator record can be incremented after the balance is read, effectively "deducting" 30 dollars from the card. The prepaid card, in the example, had enough funds (50>30) to pay for the groceries, so the transaction can be completed. The consumer can receive the groceries, and clearing and settlement can take place to transfer the funds. The prepaid card can correspondingly increment the exception record to account for the completed transaction. Thus, both the accumulator record and the exception record on the prepaid card can be calculated to 30 dollars, and the limit amount can remain 50 (as no further funds are added to the card). This way, the prepaid card can have 20 (50−30=20) dollars remaining as a balance.

The consumer may then use the prepaid card for another purchase transaction. For example, the consumer may next wish to purchase 25 dollars worth of electronics from a merchant. As before, the consumer may present the prepaid card to the merchant to pay for the transaction. However, after buying the groceries in the previous transaction, the card will only have a balance of 20 dollars left (with the accumulator record if 30 dollars and the limit amount set to 50 dollars). When the merchant reads the card, the balance may be too low ($25>$20) to make an offline (i.e., without contacting the bank) purchase. The accumulator record can still be incremented by 25, to account for the initiated transaction. The merchant can then contact the bank to see if the consumer has extra funds associated with the prepaid card. For instance, the consumer may have allocated other funds to be loaded onto the card, or associated the prepaid card with a savings account. The point of sale (POS) device that the merchant uses to read the prepaid card can contact the bank. The bank can determine if the consumer has extra funds available for the prepaid card. In this example, the consumer may have previously told the bank to add 10 dollars to the prepaid card, but the bank may not have yet loaded the prepaid card with that extra 10 dollars.

To load the 10 dollars on the card, the bank can raise the limit amount of the prepaid card by the extra funds, so that the limit amount is now set to 60 dollars (a previous limit amount of 50 plus the 10). The prepaid card may now have enough funds to pay for the transaction, which can continue through completion. The exception record can be incremented to reflect the completed transaction, by 25 dollars. Thus the accumulator record, after initiating the second transaction, can be set to 55 dollars (30 from the previous transaction plus 25 for this transaction) and the exception record can also be set to 55 dollars. The remaining balance on the prepaid card can be the difference between the limit amount and the accumulator record, or 5 dollars. In this way, the consumer can purchase the electronics. The process as in the above transactions can be repeated as the consumer uses the prepaid card.

On some occasions, a transaction may be initiated in which an exception occurs. For instance, the consumer may attempt to use the prepaid card from the above example to purchase 4 dollars worth of coffee from a merchant such as a coffee shop. The consumer can present the prepaid card to the merchant. An access device of the merchant can read the prepaid card, to see if the card has enough funds. When the prepaid card is first read, the accumulator record can be incremented by the amount of the proposed transaction ($4), so that the accumulator record can be set to 59 dollars ($55 from previous transactions plus $4). At this point in a successful (completed) transaction, the transaction would continue, for example by having the merchant give the coffee to the consumer, the prepaid card incrementing the exception record, and clearance and settlement taking place.

However, there can also be an exception scenario. In one example, after the access device first reads the prepaid card, the access device can have a malfunction, or other problems can occur. The access device may lose power, the operating software may crash, etc. In this case, the transaction may not be able to be completed. The consumer may not receive the coffee, and no funds may flow to the merchant. As the transaction never completed, the exception record may not be incremented. Thus, the accumulator record may have a different value than the exception record ($59 versus $55). In certain embodiments, the balance remaining on the prepaid card can comprise 1 dollar—the limit amount ($60) minus the accumulator record ($59). In order to purchase any goods or services valued at over 1 dollar, the bank may be contacted during the transaction. The bank can be alerted to the exception scenario that occurred, due to the accumulator record having a different value from the exception record. The bank can therefore take steps to account for the exception as described in further detail below. Such steps can include incrementing the limit amount by the difference, maintaining a record of the exception and the various data values, etc. In this way the bank will be fully apprised as to the transaction history of the prepaid card, including both completed transactions and transactions that failed due to exception scenarios. Furthermore, the consumer can be prevented from losing any money due to improperly recorded transactions.

Table 1 depicts the changes to the accumulator record, exception record, and offline balance of an example of a portable consumer device that has been used in multiple transactions. There are two or more transactions shown in Table 1, and in certain implementations, the accumulator record can retain the value of the two or more initiated transactions after funds have been collected (i.e. added) to the portable consumer device. In certain implementations, the exception record can retain the value of the two or more completed transactions after funds have been collected.

TABLE 1

| Transaction | Offline Balance (Limit Amount − Accumulator Record) | Limit Amount | Accumulator Record | Exception Record |
|---|---|---|---|---|
| Receive portable consumer device | $100 | $100 | $0 | $0 |
| Initiate transaction for $10 | $90 | $100 | $10 | $0 |

TABLE 1-continued

| Transaction | Offline Balance (Limit Amount − Accumulator Record) | Limit Amount | Accumulator Record | Exception Record |
|---|---|---|---|---|
| Complete transaction for $10 | $90 | $100 | $10 | $10 |
| Various completed purchases | ... | $100 | ... | ... |
| Spend entire offline balance | $0 | $100 | $100 | $100 |
| Add $20 to portable consumer device: | $20 | $120 | $100 | $100 |
| Initiate transaction for $20 | $0 | $120 | $120 | $100 |
| Complete transaction for $20 | $0 | $120 | $120 | $120 |

As can be seen from Table 1, in certain implementations both the accumulator record and the exception record are not reset even when more funds are added to the prepaid card (i.e., the records retains the value of past transactions). This allows the bank to keep track of all transactions over the lifetime of the prepaid card, and to know what transactions occurred offline. In such implementations, the accumulator record, the exception record, and the limit amount can be ever increasing. This can make it difficult to fraudulently or accidentally add value to the prepaid card, as the records can be compared to each other to determine if exceptions or other forms of fraud have occurred.

Specific embodiments of the invention can be described with reference to FIGS. 1-6.

I. Exemplary Systems

FIG. 1 shows a system 20 according to an embodiment of the invention. Other systems according to embodiments of the invention may include fewer or more components than are specifically shown in FIG. 1.

FIG. 1 shows a consumer 30, a portable consumer device 32, an access device 34, a merchant 22, an acquirer 24, a payment processing network 26, optionally a computer 50, and an issuer 28, in operative communication with each other. The acquirer 24 and issuer 28 can communicate through the payment processing network 26. An "issuer" is typically a business entity such as a financial institution (e.g., a bank) which maintains financial accounts for the consumer 30 and often issues a portable consumer device such as a prepaid card or debit card to the consumer 30. A "merchant" is typically an entity that engages in transactions, such as a store, supplier, merchant, person, or service provider. The access device 34 is used by the merchant 22 to communicate with other parties in the system, such as the portable consumer device 32 and the acquirer 24 or the payment processing network 26, and can comprise a computer, a telephone, or other communication means.

The consumer 30 can communicate with issuer 28, such as to add or change the amount of money stored on portable consumer device 32. The issuer 28 can then add the money received from the consumer 30 to portable consumer device 32, or make other adjustments. The portable consumer device 32 can have a memory element that contains an exception record 303 and other data, and can record how much money is stored. The portable consumer device 32 can also have a controller such as a processor, for performing the data calculations and other processes described herein. The issuer 28 can adjust the data in the memory element of the portable consumer device 32 to adjust the amount of money stored therein. The money stored therein can comprise an offline balance that the portable consumer device 32 can spend in transactions that do not require communicating w/an issuer.

The consumer 30 can communicate with the issuer 28 in a number of ways in order to change the amount of money on the portable consumer device 32, or for other purposes. The consumer 30 can, for instance, call, use an automated teller machine (ATM), or walk into local branch office of the issuer (i.e., direct communication) to deposit money for loading onto the portable consumer device. In some embodiments, the consumer may also contact the issuer through a computer 50 that communicates with issuer 28 through the Internet 55. In some embodiments, the consumer may use the computer 50 to communicate, through the Internet 55, with the payment processing network 26. Computer 50 may comprise any suitable computing device, such as a desktop, tablet, or laptop computer, a wireless phone, a PDA, a television connected set top box, a media center, a gaming device, etc.

In a typical payment transaction, a consumer (i.e. the "cardholder") 30 may buy goods or services from the merchant 22. The merchant 22 can use the access device 34 to read the portable consumer device 32, which can be a prepaid card that carries an offline balance. In one aspect, the amount of the offline balance can be calculated by determining the difference between an accumulator record and a limit amount, both of which can be stored in a memory unit on the portable consumer device 32. The value of the accumulator record can be incremented to reflect the payment transaction. If the offline balance on the card was enough to fully pay for the transaction, no further communication is necessary and the exception record 303 can also be incremented. However, if the offline balance is not enough for the transaction, the merchant 22 can then contact the payment processing network 26 (either directly, or through the acquirer 24) to determine if additional funds are available. The payment processing network can then contact the issuer 28 of the portable consumer device 32, to see if there are further funds available. If there are more funds, the transaction can be approved and completed, and the exception record 303 can be incremented. Once the transaction is approved, the acquirer 24 can be alerted and funds can be transferred between the proper parties.

As used herein, an "acquirer" is typically a business entity, e.g., a commercial bank that has a business relationship with a particular merchant or other entity. Some entities can perform both issuer and acquirer functions. Embodiments of the invention encompass such single entity issuer-acquirers.

The consumer 30 may be an individual, or an organization such as a business that is capable of purchasing goods or services.

The payment processing network 26 may have a server computer 44, as well as a database 48. The server computer 44 is typically a powerful computer or cluster of computers. For example, the server computer can be a large mainframe, a minicomputer cluster, or a group of servers functioning as a unit. In one example, the server computer may be a database server coupled to a web server. The server computer may comprise a computer readable medium comprising code for processing transactions as detailed below, including code for receiving messages from consumers, merchants, acquirers, and issuers, code for managing stored value devices such as prepaid cards, code for sending messages, code for identifying issuers, and code for clearing and settling transactions and chargeback requests in substantially real time.

The issuer 28 can also have an exception module 49, in operative communication with server computer 44 of payment processing network 26, or other suitable sever computers within issuer 28. Exception module 49 can comprise one or more server computers, one or more databases, or any suitable combination therein. Exception module 49 may also comprise a computer readable medium that stores data relating to the portable consumer device 32. For example, the exception module 49 may maintain a shadow copy of all data stored in the memory element of portable consumer device 32. Exception module 49 may also comprise computer readable media comprising code to record transaction history and any exception scenarios that have occurred, code for fraud and error detection of the portable consumer device 32, and code for other processing related to portable consumer device 32. The exception module 49 may be directly electrically connected to server computer 44 or other servers within issuer 28, or may be connected through intermediary systems such as the Internet. In certain embodiments, all functions of the exception module can be performed within the payment processing network 26, using exception module 47. In some embodiments, exception module 47 can partially or entirely be part of server computer 44, database 48, or a combination of both, such that portions of the payment processing network 26 can perform some or all of the functions of exception module 47.

The payment processing network 26, the issuer 28, and/or exception modules 47 or 49 may also comprise a computer readable medium comprising code for maintaining a shadow account for the portable consumer device, the shadow account comprising a shadow accumulator record and a shadow exception record. In certain implementations, the shadow accumulator record retains the value for each initiated transaction in the portable device transaction history, and the shadow exception record retains the value for each completed transaction in the portable consumer device transaction history. Both records may be retained upon additional funds being collected on the portable consumer device.

The payment processing network 26 may comprise or use a payment processing network such as VisaNet™ or Banknet™. The payment processing network 26 and any communication network that communicates with the payment processing network 26 may use any other suitable wired or wireless network, including the Internet. The payment processing network 26 may be adapted to process ordinary debit or credit card transactions, along with prepaid card transactions as contemplated herein. In embodiments, the payment processing network 26 may perform any or all of the functions described herein as being performed by an issuer.

Although the payment processing network 26 is illustrated as being operationally between an acquirer 24 and an issuer 28, it need not be in other embodiments of the invention. Payment processing network 26 may include any suitable combination of computer apparatuses which can facilitate the processing described in this application.

The consumer 30 and merchant 22 can use an access device 34 to communicate with the issuer 28 or payment processing network 26. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. The access device may comprise a convenient interface such as a web browser on a computer that communicates over the Internet.

In certain embodiments, the access device 34 may comprise a processor and a computer readable medium, wherein the computer readable medium comprises code for determining a value for the transaction, code for determining the value of an accumulator record stored in a memory of the portable consumer device, code for incrementing the accumulator record by the value of the transaction upon the initiation of the transaction, wherein the accumulator record retains the value of the transaction upon additional funds being collected on the portable consumer device. The computer readable medium may also comprise code for determining the value of an exception record stored in the memory of a portable consumer device and code for incrementing the exception record by the value of the transaction, upon completion of the transaction.

In certain embodiments, the portable consumer device 32 may comprise a processor and a computer readable medium, wherein the computer readable medium comprises code for determining a value for the transaction, code for determining the value of an accumulator record stored in a memory of the portable consumer device, code for incrementing the accumulator record by the value of the transaction upon the initiation of the transaction, wherein the accumulator record retains the value of the transaction upon additional funds being collected on the portable consumer device. The computer readable medium may also comprise code for determining the value of an exception record stored in the memory of a portable consumer device and code for incrementing the exception record by the value of the transaction, upon completion of the transaction.

For simplicity of illustration, one consumer 30, one portable consumer device 32, one merchant 22, one access device 34, one acquirer 24, and one issuer 28 are shown. However, it is understood that in embodiments of the invention, there can be multiple consumers, portable consumer devices, merchants, access devices, acquirers, issuers, as well as server computers, databases, accounts, etc.

II. Exemplary Processes

Figure 2:
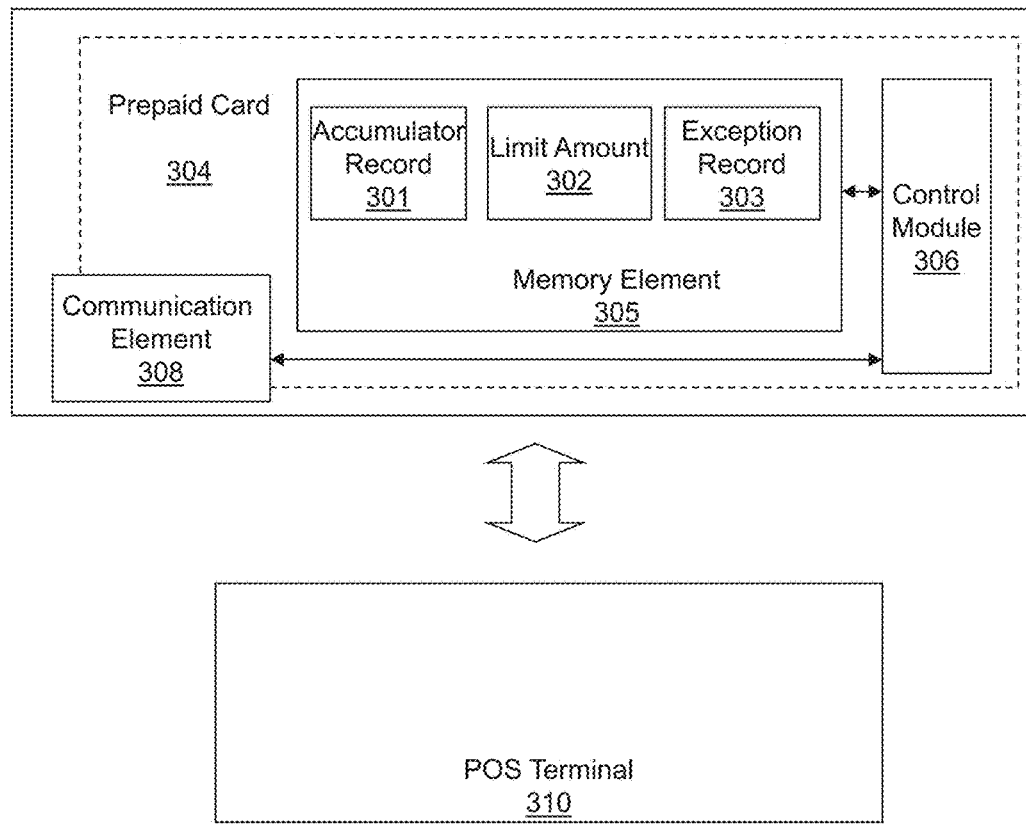
FIG. 2 is a functional block diagram illustrating a method of communication according to an embodiment of the invention.

FIG. 2 provides a functional block diagram of an example of a portable consumer device communicating with POS terminal 310. The portable consumer device depicted in FIG. 2 comprises a prepaid card 304 that has money stored within. More particularly, in this embodiment the prepaid card 304 contains a memory element 305. Memory element 305 may be any suitable computer readable medium, such as an electrically programmable read only memory (EPROM), flash memory, ROM, RAM, a magnetic strip, etc. Memory element 305 can contain data relating to the money stored within the card, transaction history, etc.

In exemplary embodiments, memory element 305 can include data for at least three records—an accumulator record 301 a limit amount 302, and an exception record 303. The limit amount 302 can comprise a number, denominated in the currency the prepaid card 304 conducts transactions in, that represents the amount of money loaded onto the prepaid card 304. In certain implementations, the limit amount 302 represents the amount of money loaded, or collected, onto the prepaid card 304 over the lifetime of the prepaid card 304. In some implementations, the limit amount 302 may also be adjusted as necessary to accurately store the correct offline balance on the card, as will be described in greater detail below.

The accumulator record 301 can also comprise a number, denominated in the same currency as the credit limit. The accumulator record 301 can be a number that is incremented upon the initiation of a transaction, and can retain the value of past transactions involving the prepaid card. For example, the accumulator record 301 can be set (by the issuer or other suitable entity) to zero (0) when the prepaid card 304 is first issued to a consumer. Then, for each initiated transaction involving prepaid card 304, the accumulator record can be incremented by the amount of the transaction. This allows for lifetime tracking of card transactions, including both completed and uncompleted (i.e., initiated but not completed) transactions. Exemplary accumulator records, and systems and methods of using accumulator records, are described in U.S. patent application Ser. No. 12/428,181, entitled "Prepaid Portable Consumer Device Including Accumulator", filed on the same day as the present application, which is herein incorporated by reference in its entirety for all purposes.

The memory element 305 can also include data for an exception record 303. This exception record 303 can comprise a number, denominated in the same currency as the accumulator record. The exception record 303 can be a number that reflects all completed transactions involving the prepaid card. In certain embodiments, the exception record 303 may be incremented only after a transaction has completed, or at some other suitable time where completion is determinable. In exemplary embodiments, the exception record 303 may never be reset for the lifetime of the prepaid card.

As mentioned above, in some embodiments, the accumulator record 301 can be incremented upon initiating any transaction. In comparison, some embodiments have the exception record 303 be incremented once the transaction has completed, or at any suitable step after which the transaction has been approved. Thus, the exception record 303 an be used for error correction of any data stored on a card. If the accumulator record 301 or other data fields have incorrectly been incremented, or have been incremented for a transaction that never completed, adjustments can be made to the data.

For example, if a transaction for a 10 dollar purchase was initiated, the accumulator record 301 may have been incremented by 10 dollars. However, if the transaction was not completed (i.e., consummated), the limit amount 302 may not have been incremented, and the prepaid card 304 will effectively have 10 dollars less in the offline balance than it should (as balance can equal limit amount minus accumulator record). Since the transaction did not go through completion, the exception record 303 may not have been incremented. The transaction may not have been completed, for a number of exceptions, including failure of the lines of communication during the transaction, machine error, or removing the portable consumer device from the access device before the transaction is completed. The next time an issuer or payment processing network is in communication with the prepaid card, it can receive and compare the accumulator record 301 with the exception record 303 to determine that a transaction started but did not finish. In this example, the accumulator record 301 will be 10 dollars greater than the exception record 303. Since, in certain embodiments, the accumulator record is not reset, the limit amount 302 can be increased by the 10 dollars. In this way, the offline balance of prepaid card 304 can be set to the correct amount. In certain embodiments, the issuer and/or payment processing network can keep a record of the ongoing difference (i.e., the $10) between the accumulator record 301 and the exception record 303.

In exemplary embodiments, the limit amount 302 comprises the amount of money added to the prepaid card, and the accumulator record 301 comprises the amount of money intended to be spent by the prepaid card. In such embodiments, the amount of money stored on the prepaid card 304 at any given time can be calculated by determining the difference between the limit amount 302 and the accumulator record 301. The amount of money stored on the card can comprise the "offline balance," which is the amount of money that can be spend by the prepaid card 304 in transactions, without having to add further funds to the card. In certain embodiments, the offline balance may be stored as a separate record in memory element 305. In some embodiments, a control module 306 can determine the offline balance and store it as a record in memory element 305. In other embodiments, the offline balance may be calculated by an external computer such as POS terminal 310, and the external computer can store the record in memory element 305. In some embodiments, the offline balance can alternatively comprise the difference between the limit amount 302 and the exception record 303.

In exemplary embodiments, prepaid card 304 can include a control module 306 (e.g., a controller such as a processor, microprocessor, processor element, state machine, or other logic element) that is configured to execute data processing operations for data stored in the memory element 305. Control module 306 may also execute processes in connection with conducting communications with external devices, such as POS terminal 310. In some embodiments, prepaid card 304 may not include a control module 306, and the data processing operations can be executed by external devices in communication with the prepaid card 304.

Prepaid card 304 may include a communication element 308. Communication element 308 can facilitate the transfer of information (i.e., communications) between prepaid card 304 and external devices, such as POS terminal 310. In some implementations, communication element 308 may utilize one or more wireless data transfer mechanisms, e.g., RF (such as RFID), Bluetooth™, Infra-Red, Optical, Near Field Communications, etc. Communication element 308 may include, for example, a wireless antenna (as seen by the dashed line in FIG. 2) for transmitting or receiving data, or optical emitters or receivers for receiving or transmitting data. In some implementations, communication element 308 may utilize a wired data transfer mechanism. In these implementations, communication element 308 may comprise one or more electrical contacts on the outside of prepaid card 304, a magnetic stripe, or any other suitable communication mechanism.

Communication element 308 can be used to communicate with access devices, such as POS terminal 310. POS terminal 310 can have a corresponding communications element, and a processor. Data stored in memory element 305 can be transmitted by the communication element 308. For example, prepaid card 304 may comprise a "contact" type smart card device, such that a physical connection (e.g., a contact interface) between POS terminal 310 and prepaid card 304 can be used for communication. To conduct a transaction, a merchant can therefore place the prepaid card 304 into a corresponding reader slot in the POS terminal 310. One or more connectors within the slot of the POS terminal 310 can contact the communication element 308. In this way, data can be transmitted between the POS terminal 310 and the prepaid card 304. In other implementations, prepaid card 310 can be "swiped" through the POS terminal 310, or other suitable contact methods can be used. In other examples, prepaid card 304 may comprise a "contactless" type smart card device, such that a wireless connection between POS terminal 310 and prepaid card 304 can be used for communication. To conduct a transaction, prepaid card 304 may be placed within proximity of the POS terminal 310, and data can be transferred. As used herein, "proximity" can comprise being within a required distance, such as 10 ft, or can comprise "tapping" the portable consumer device against the access device.

In exemplary embodiments, POS terminal 310 can communicate with prepaid card 304 as described above to conduct a purchase transaction. In certain embodiments, POS terminal 310 can connect to the portable consumer device twice during a transaction. POS terminal 310 can communicate with prepaid card 304 a first time, to determine (e.g. read from the portable consumer device) if the offline balance of prepaid card 304 is enough to cover the purchase. In other words, POS terminal 310 can query prepaid card 304, using communication element 308, to see if the difference between limit amount 302 and accumulator record 301 is greater than or equal to the purchase amount. In exemplary embodiments, the prepaid card 304 itself can determine if the difference between limit amount 302 and accumulator record 301 is greater than or equal to the purchase amount, and can communicate such information to the POS terminal 310. The POS terminal 310 may communication with the prepaid card 304 a second time, to complete the transaction. This second communication can be to alert the prepaid card 304 to the completion of the transaction, and to update the exception record 303, limit amount 302, or for any other suitable processing. The steps of conducting a transaction will be described in greater detail below.

Figure 3:
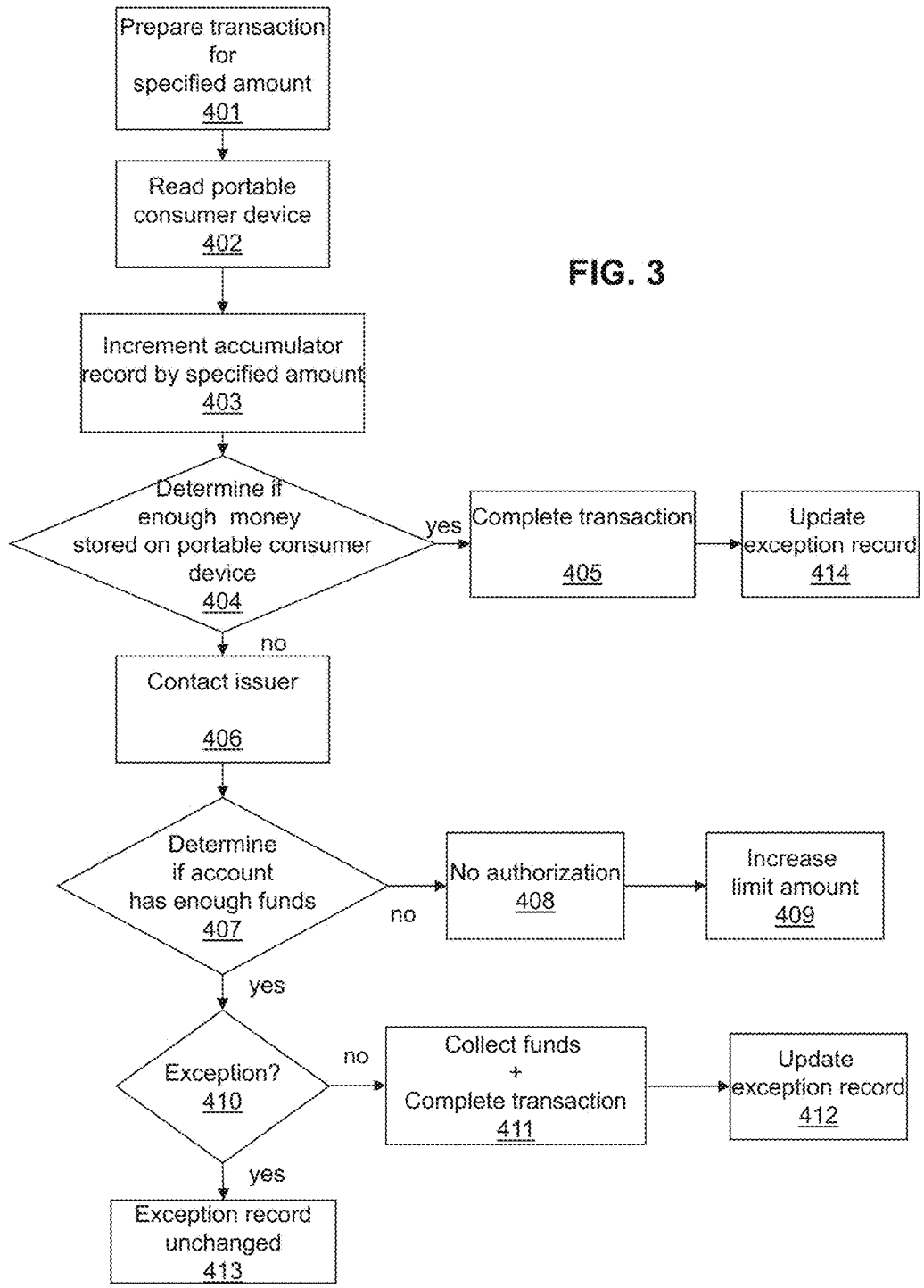
FIG. 3 is a flowchart illustrating a method according to an embodiment of the invention.

FIG. 3 provides a flow diagram of an exemplary transaction process performed by all or portions of the system 20 of FIG. 1. In certain embodiments, the transaction processes may differ, depending on the nature of the transaction and the specific parties involved.

In step 401, a consumer can prepare for a transaction. As detailed above, the transaction can be a financial transaction in which the consumer (i.e., the buyer) pays a merchant (i.e., the seller) for goods or services. Prior to, or during, step 401, the consumer can decide to use a portable consumer device, such as a prepaid card, to pay for the transaction, and the value of the transaction (i.e., the cost of the goods or services plus applicable taxes and fees) can be determined as is known in the art. In step 402, the merchant can use an access device to read the portable consumer device, as described above with reference to FIG. 2. This can comprise a first connection to the portable consumer device. In some embodiments, the access device may read the offline balance from the portable consumer device. In some embodiments, the access device may read the accumulator record, exception record, and the limit amount from the portable consumer device. The access device, or other suitable system, can then calculate the offline balance, such as by subtracting the accumulator record from the limit amount.

During step 402, the access device can also communicate the amount of the transaction to the portable consumer device. In certain embodiments, the portable consumer device can determine if there are enough funds stored within to complete the transaction offline. The accumulator record can be incremented by the amount of the transaction, in step 403. For example, the accumulator record can have a value of 15 dollars prior to the transaction and the transaction can be a purchase that totals 18 dollars (including tax and other applicable fees). Therefore, the accumulator record of the portable consumer device can be incremented, using a processor in the portable consumer device, by the transaction value to a new value of 33 dollars. This value may be stored in a memory device in the portable consumer device, in step 403.

In exemplary embodiments, steps 402 and 403 can occur simultaneously, or nearly simultaneously. That is, the transaction is "initiated" when data on the portable consumer device is read and the accumulator record is incremented. In exemplary embodiments, the accumulator record is incremented by the amount of the transaction, immediately or soon after the portable consumer device is read.

In exemplary embodiments, only the accumulator record in the memory device may be incremented by the processor during the initiation of the transaction. Thus, in these embodiments the limit amount and the exception record may not be revised in step 403. In the next step, there can be a determination of whether the portable consumer device contains enough funds to pay for the transaction (i.e., whether the offline balance prior to the transaction is greater than or equal to the transaction price). The portable consumer device (or a processor therein) or an access device (or a processor therein) can compare the offline balance determined in step 402 with the purchase price to determine if the portable consumer device has enough funds. Alternatively, in step 404 the processor in the portable consumer device (or one in the access device) may compare the accumulator record to the limit amount of the portable consumer device. If the accumulator record is less than or equal to the limit amount (after being incremented in step 403), then the portable consumer device has enough funds.

If there was enough money stored on the portable consumer device, then the transaction will be completed in step 405. The consumer may receive the goods or services just purchased. Clearing and settlement between the respective parties can take place so that the merchant can ultimately receive payment. In step 414, the exception record on the portable consumer device can be incremented by the purchase price, to reflect the successful transaction. In certain embodiments, step 414 can comprise a second connection between the access device and the portable consumer device. Step 414 can occur simultaneously, or nearly simultaneously, with step 405. That is, the exception record may be incremented upon (i.e., during or soon after) completion of the transaction.

If there was not enough money stored on the portable consumer device, the transaction may be canceled. In such instance, the limit amount may be incremented by an amount equal to an amount that the accumulator record was incremented by in step 403. Thus, the accumulator record will retain the value of the canceled (but initiated) transaction, and the offline balance will be reset to the value prior to the initiation of the transaction in step 401. In certain embodiments, the exception record may also be incremented by the same amount. In some embodiments, either of the limit amount or exception record may not be incremented as described above in this paragraph. Rather, the issuer or payment processing network can make note of the discrepancy of the accumulator record, and account for such discrepancy in later processing.

However, the parties may wish to continue with the transaction, by checking if the consumer has extra funds. It can be advantageous to continue the transaction with the original payment source, as finding another payment source may be time consuming and unproductive. Furthermore, there may be an embarrassment factor for the consumer to have a funding source denied. Embodiments described herein prevent such problems. In certain embodiments, after it is determined that the offline funds were not enough to pay for the transaction, the merchant can contact the issuer of the portable consumer device in step 406. In exemplary embodiments, the access device may automatically contact the issuer after such determination. In some embodiments, the merchant may contact the issuer over any suitable means, such as by payment processing network, phone, separate computer, etc.

In exemplary embodiments, the merchant may identify the issuer of the portable consumer device from data in the memory element, or as determined by the payment processing network. The merchant can send an authorization request message to the issuer. In certain embodiments, the authorization request message can include information identifying the portable consumer device. The authorization request message can also contain information relating to the current transaction, such as the remaining amount needed to complete the payment (i.e., the difference between the transaction amount and the offline balance of the portable consumer device). The authorization request message may also contain the values of the limit amount, the accumulator record, the exception record, etc.

The issuer can maintain an associated, or "shadow," account to keep a record of the portable consumer device. For example, the issuer or payment processing network can maintain the shadow account in an exception module as shown in FIG. 1. This shadow account can contain records of the data stored on the portable consumer device, including a shadow accumulator record, a shadow exception record, and a shadow limit amount, as will be described in greater detail below.

In step 407, the issuer can review the authorization request message. The issuer can determine the amount of offline balance on the portable consumer device (such as from the authorization request message) and can compare that to information in the shadow account. In some implementations, the shadow account can indicate that there are extra funds available to the consumer, even if those funds are not stored on the portable consumer device. This can be due to any suitable reason. For example, the consumer may previously have instructed the issuer to add funds to the portable consumer device, but the current transaction may occur before the issuer has had an opportunity to increase the offline balance. In another example, the consumer may have linked a second account to the portable consumer device account, and transactions can draw funds from this second account when necessary.

If the issuer determines that the account associated with the portable consumer device does not have enough funds to consummate the transaction, then the transaction is not authorized. In step 408, the issuer can send an authorization response message to the merchant indicating that the transaction is declined. In some implementations, the authorization response message may also include a replacement value for the limit amount. The limit amount on the portable consumer device can be incremented to be equal to the replacement value in step 409. This replacement value can comprise the current value of the limit amount, plus the amount the accumulator was incremented by in step 403. This is to correct the value of the offline balance of the portable consumer device, as the accumulator value has already been incremented even though the transaction was canceled. The access device may provide the portable consumer device with the replacement value in a second connection. In other implementations, the control module on the portable consumer device, or the access device, may calculate the replacement value to adjust the limit amount in step 409.

In some embodiments, the account may have had extra funds beyond the value of the offline balance, but still not enough to pay for the transaction. These extra funds may be added to the portable consumer device (i.e., "collected")

even if the transaction is not authorized. For example, a transaction may have originally cost 25 dollars, but only 15 dollars was in the offline balance of the device (accumulator value $5, and limit amount $20), and the account only had 8 dollars available online. In some of these embodiments, the authorization response message sent in step 408 can include a replacement value that comprises the current card limit plus the amount the accumulator was incremented by, plus the value of the extra funds. In the above example, the accumulator value would have been incremented by the 25 dollars of the original transaction (to $30 total), so the replacement value would comprise the current limit amount ($20) plus 25 dollars, and further plus 8 dollars. Therefore, in this example, the card limit would be increased to be equal to 53 dollars in step 409. This can result in an offline balance of 23 dollars ($53 limit amount minus $30 accumulator record).

If the issuer determines that the account associated with the portable consumer device does have enough funds to consummate the transaction (i.e. the funds in the account plus the offline balance is greater than or equal to the transaction price), then the transaction can be authorized. The transaction may be completed at this time. However, at any point in the process flow, an exception 410 may occur. As described above, an exception can be any scenario in which the process is interrupted. For example, the access device of the merchant may have a system malfunction, or lose communications (phone lines go down, etc.). An exception can also occur when the portable consumer device is removed from communication with the access device, such as after the first connection but before the second connection. An exception can happen at any time, including when the issuer or payment processing network has sent an authorization response message including a replacement value for the limit amount.

Due to the exception scenario, the message may not reach the access device or portable consumer device. In such an example therefore, the issuer may think funds have been collected on the portable consumer device and the transaction has been completed; in fact, no extra funds have been added and that transaction has not completed. Also due to the exception scenario, the limit amount and exception record on the portable consumer device will not have been changed, as in step 413. The issuer or payment processing network will determine this when it reads the portable consumer device during the next communication (e.g. an online transaction or receiving clearance and settlement information from a future transaction). The issuer or payment processing network can thus determine that the funds were not added in the transaction in question, and that the transaction never completed.

After step 413, the issuer or payment processing network can record the exception data, and can compensate for the incremented accumulator record as described above (e.g., increase the limit amount to restore the offline balance, etc.). By having the exception record increment only after completion of a transaction, the issuer or payment processing network can easily determine if there has been an exception during any transaction. In certain embodiments, the use of at least three separate and independently updated records (accumulator record, exception record, and limit amount) allows for the issuer or payment processing network to have a complete picture of the transaction history of the portable consumer device. In these embodiments, the portable consumer device can operate offline with reduced risk of fraud or error, which can reduce costs to all parties shown in FIG. 1. In certain aspects, an exception as in step 410 can occur at any point in the process flow. Once the transaction has occurred, further processing may stop in some implementations. Thus, if the exception occurs prior to the portable consumer device being read by the access device in step 402, the accumulator record will not be incremented. An example of this may be when a POS terminal is inoperative before it can communicate with a prepaid card. In such instance, the transaction may be stopped, or alternative means of payment may be used (cash, check, etc). In some implementations, the exception can be compensated for, such as by continuing with an alternative (e.g. a properly functioning) access device or communication system. Thus, in certain implementation, an exception scenario does not prevent a transaction from completing.

If no exception has occurred in step 410, or the exception has been compensated for, the transaction can continue through completion in steps 411-412. The issuer in step 411 can send an authorization response message to the merchant indicating that the transaction is authorized. In some implementations, the authorization response message may also include a replacement value for the limit amount. This replacement value can include the extra funds to be collected on the portable consumer device. The limit amount on the portable consumer device can be incremented to be equal to the replacement value in step 411. In certain implementations, the replacement value can be provided to the portable consumer device in a second connection with the access device. In this manner, the extra funds are collected on the portable consumer device. If the offline balance after step 411 (comprising the value of the limit amount minus the value of the accumulator record) is greater than zero, then the portable consumer device has funds for future purchases. In certain embodiments, the limit amount can be incremented by an amount equal to adding the accumulator record received in the authorization request message, to a shadow balance amount. The shadow balance amount may be a record maintained by the shadow account that determines the amount of funds left to spend on the portable consumer device.

The transaction can then be completed, in step 411. The consumer may receive the goods or services just purchased. Clearing and settlement between the respective parties can take place so that the merchant can ultimately receive payment. In some embodiments, the exception record on the portable consumer device will be incremented by the purchase price, to reflect the successful transaction. The exception record may be updated in step 412 to indicate that the transaction has been completed, such as by incrementing the exception record by the amount of the transaction. In certain embodiments, step 412 can occur simultaneously with step 411. In certain embodiments, step 412 can happen soon or immediately after step 411.

The shadow account can also be adjusted at any suitable time, to reflect the current state of the portable consumer device. The shadow accumulator can be incremented to have a value equal to the value of the accumulator record on the portable consumer device. In exemplary embodiments, the shadow accumulator record is never reset, similar to the accumulator record. The shadow limit amount and the shadow exception record can be adjusted to have values equal to their counterparts on the portable consumer device, etc. In embodiments described herein, there can be two records that retain the value of each initiated transaction in the portable device transaction history, upon additional funds being collected on the portable consumer device—the accumulator record, and the shadow accumulator record. In certain of these embodiments, there can be two records that retain the value of each completed transaction in the portable device transaction history, upon additional funds being collected on the portable consumer device—the exception record, and the shadow exception record.

In certain embodiments, the steps described above with regard to FIG. 3 may be performed by the portable consumer device. In other embodiments, the steps described above with regard to FIG. 3 may be performed by the access device, or a combination of the access device and portable consumer device. For example, in exemplary embodiments, the access device may determine the value for the transaction. The portable consumer device may determine the value of the accumulator record, and increment the accumulator record by the value of the transaction. The portable consumer device (such as a processor therein) may determine if the portable consumer device has enough funds to complete the transaction, and can report that to the access device. The access device may then read the value of the accumulator record and the value of the limit amount to include in the authorization request message. Upon completion of the transaction, the portable consumer device may increment the exception record.

Figure 4:
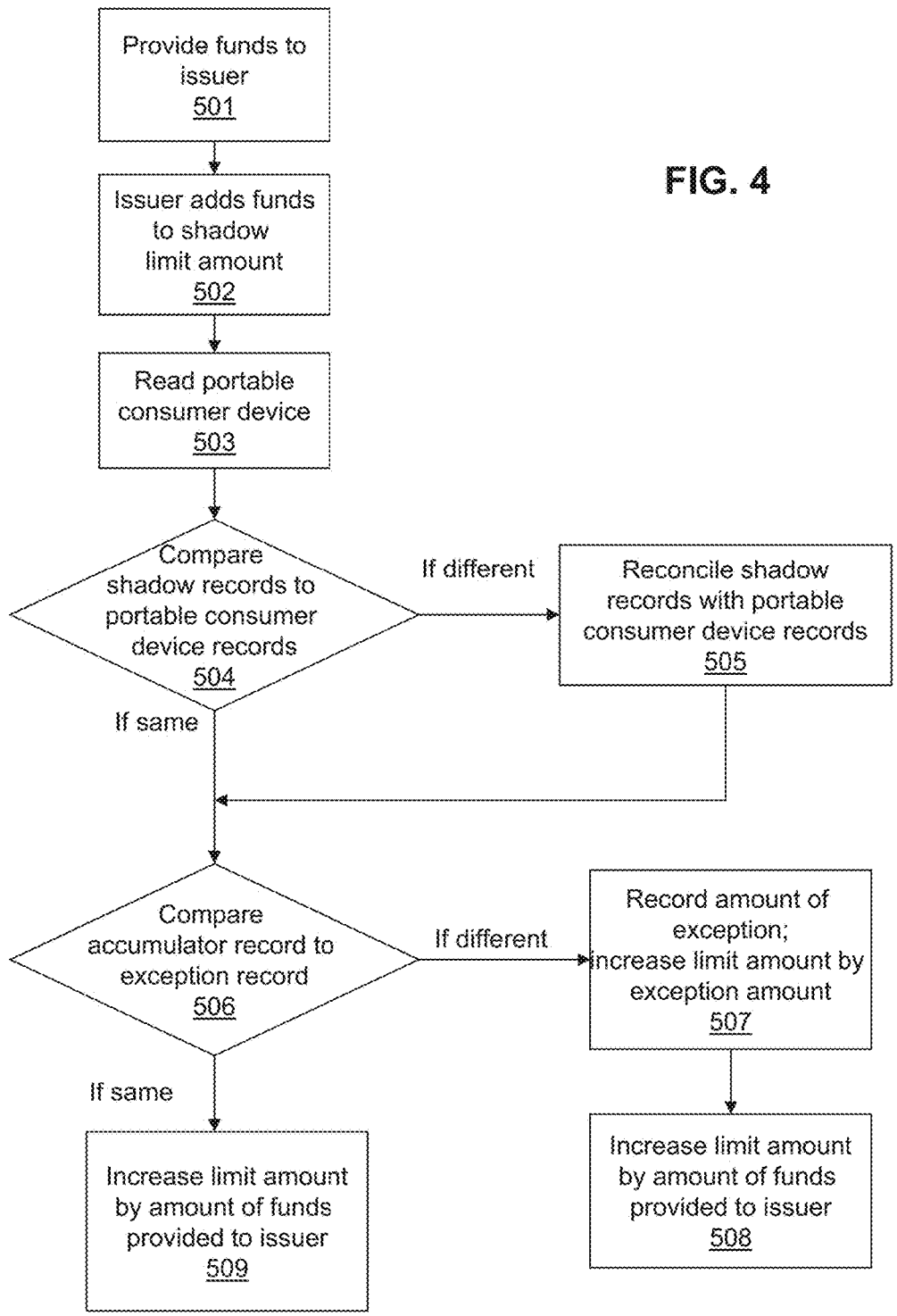
FIG. 4 is a flowchart illustrating a method according to an embodiment of the invention.

As described above, a consumer may add value to their portable consumer device. This extra money can be added to the value stored on the portable consumer device, to increase the amount of purchasing power. In certain embodiments, the issuer can be in communication with the portable communication device while the funds are being collected. During this time, the issuer or payment processing network may also reconcile the data on the portable consumer device with the data in the shadow account. FIG. 4 shows a method of adding value to a portable consumer device according to an embodiment. In step 501, a consumer can provide funds to the issuer of the portable consumer device. This can be done in any suitable way. The consumer can provide cash or a check, or transfer funds electronically (using a computer, by phone, ATM, etc), by credit card, from another account, etc. The issuer can maintain a shadow account related to the portable consumer device. This shadow account may be stored entirely or partly on a server of the issuer or a payment processing network. The shadow account can include shadow copies of each data element stored in the portable consumer device, such as a shadow accumulator record, a shadow limit amount, a shadow exception record, etc. The shadow account can include other data to allow the issuer to keep track of the portable consumer device, such as more detailed records of transactions (both authorized and canceled), data relating to the consumer, etc.

When the issuer first receives the funds in step 501, it can store the value of the funds as host funds. The payment processing network and/or the issuer may perform certain processing on the host funds, such as fraud detection. The value of the host funds can then be added to the value of the shadow limit amount, in step 502. This prepares the shadow account for updating the portable consumer device.

The issuer can add the host funds to the value of the shadow limit amount, in step 502. For example, if the issuer had initially loaded 30 dollars on the portable consumer device, the limit amount would be set to 30 dollars, as would the shadow limit amount. Should the consumer use the portable consumer device in transactions, the accumulator record of the portable consumer device can be incremented at the initiation of the transaction, and the exception record can be incremented at the completion of the transaction. Similarly, the shadow accumulator record and the shadow exception record can increment (to match the accumulator record and exception record on the portable consumer device) any time the issuer receives notification of a transaction, such as during clearance and settlement, or when a merchant contacts the issuer during a transaction. The limit amount, however, may not increment unless funds are added. Therefore, after step 502, the shadow limit amount can be greater (by the value of the funds added) than the limit amount. In certain implementations, this imbalance between the shadow limit amount and the limit amount may last only until the issuer next is in communication with the portable consumer device.

The issuer may communicate with the portable consumer device to increase the offline funds or perform other updates, starting in step 503. In certain implementations, this can happen in a variety of ways, such as when the merchant contacts the issuer during a transaction as described above. Also, the issuer can communicate with the portable consumer device when a consumer uses an ATM to add to the funds. For example, a consumer may insert or wirelessly connect the portable consumer device with an ATM associated with the issuer, to deposit or transfer funds to the portable consumer device. While the portable consumer device is connected to with the ATM, the issuer may update the data as described below.

In step 504, the issuer can compare the data on the portable consumer device (accumulator record, exception record, limit amount, etc.) with the data of the shadow account (shadow accumulator record, shadow exception record, shadow limit amount, etc.). If the values are the same, then the records in the shadow account may be up to date and the issuer can perform further analysis starting in step 506.

In some instances, some or all the data in the shadow account and the data stored on the portable consumer device can differ. This can happen, for example, if the portable consumer device has been used in one or more offline purchases, such that the issuer was not contacted during the one or more transactions. The transaction(s) may not have completed settlement and clearance prior to reading the portable consumer device in step 503, so that the issuer has not incremented the shadow accumulator record or shadow exception record. In such instance, only the accumulator record and exception record on the portable consumer device will presently retain the value of the completed transaction(s), and each may be greater than their shadow record counterparts. Therefore, in step 505, the issuer can replace the value of the shadow accumulator record with the value of the accumulator record on the portable consumer device. This can have the effect of incrementing the shadow accumulator record to retain the value of the one or more initiated offline transactions. In step 505, the issuer can also replace the value of the shadow exception record with the value of the exception record on the portable consumer device. This can have the effect of incrementing the shadow exception record to retain the value of the one or more completed offline transactions. Furthermore, other data records in the shadow account may be updated to record that one or more offline transaction have occurred.

The issuer or payment processing network can also compare the accumulator record with the exception record, in step 506. In certain embodiments, step 506 may occur simultaneously with step 505. In certain embodiments, step 506 may occur prior to or after step 505. This comparison can be performed to determine if the portable consumer device has experienced an exception scenario. In certain implementations, the issuer or payment processing network can determine if an exception scenario has occurred since a selectable date. The issuer or payment processing network can also determine the value of the exception (e.g. the exception scenario that has occurred). This selectable date can comprise the last time the portable consumer device has been in communication with the issuer or payment processing network, the date of the most recent transaction for which the issuer or payment processing network has received clearance and settlement information, or other suitable time and date.

If there is a difference between the value of the accumulator record and the value of the exception record, that can indicate that one or more exceptions (i.e., exception scenarios) have occurred. The issuer or payment processing network may then take suitable steps to reconcile the records to account for the exception(s) in step 507. In certain embodiments, the issuer or payment processing network can increment the value of the shadow limit amount by the value of the exception as determined above. For example, this can include the issuer or payment processing network recording the amount of the exception (e.g., the numerical difference between the exception record and the accumulator record) as a record in the shadow account. The issuer or payment processing network may also increase the limit amount by the amount of the exception, to restore the offline balance to the correct amount (i.e., accounting for the incomplete transaction or transactions). The records in the shadow account (such as the shadow limit amount) may be adjusted to reflect the changes to the data on the portable consumer device. For example, in step 502, the shadow limit amount was increased to reflect additional funds added to the account by the consumer. The shadow limit can be further increased in step 508, to account for the accumulator record increasing for a transaction that was initiated, but never completed.

Once the exception(s) have been recorded, the issuer can add the funds provided by the consumer in step 501 to the portable consumer device, in step 508. The issuer can increase the value of the limit amount of the portable consumer device, to reflect the increased offline balance. In exemplary embodiments, the value of the card limit can be set to be equal to a replacement value sent from the issuer, such as by a authorization response message, or other suitable message. The replacement value can comprise the amount of additional funds to be collected on the portable consumer device. In certain examples, the replacement value can be the shadow limit amount which has been incremented to reflect both the funds added in step 502 and the amount of the exception added in step 507.

If no exceptions have been determined to have occurred in step 506, the issuer can add the funds to the portable consumer device in step 509. The issuer can increase the value of the limit amount of the portable consumer device, to reflect the increased offline balance. In exemplary embodiments, the value of the card limit can be set to be equal to a replacement value sent from the issuer, such as by a authorization response message, or other suitable message. The replacement value can comprise the amount of additional funds to be collected on the portable consumer device. In certain examples, the replacement value can be the shadow limit amount which has been incremented to reflect the added funds in step 502.

After step 509 (or 508 in certain situations), the portable consumer device has collected the additional funds and may spend the additional funds in offline transactions. Note that both the accumulator record and the shadow accumulator record can retain the value of all initiated transactions, even upon additional funds being collected on the portable consumer device. Furthermore, both the exception record and the shadow exception record can retain the value of all completed transactions, even upon additional funds being collected on the portable consumer device. At any time, the accumulator record, the limit amount, the exception record, or the shadow versions of the data, can be incremented higher to correct for any discrepancy among records. Thus, in embodiments herein, it can be unnecessary to ever reset (i.e., set to zero or a lower value) the value of the accumulator record, exception record, shadow exception record, or the shadow accumulator record. This can prevent errors. Furthermore, as described above, storing data in various records of the portable consumer device (and shadow account) allows for precise tracking of transactions and simplifies discovery and correction of any errors or incongruities in the data.

III. Portable Devices and Computer Apparatuses

Figure 5A:
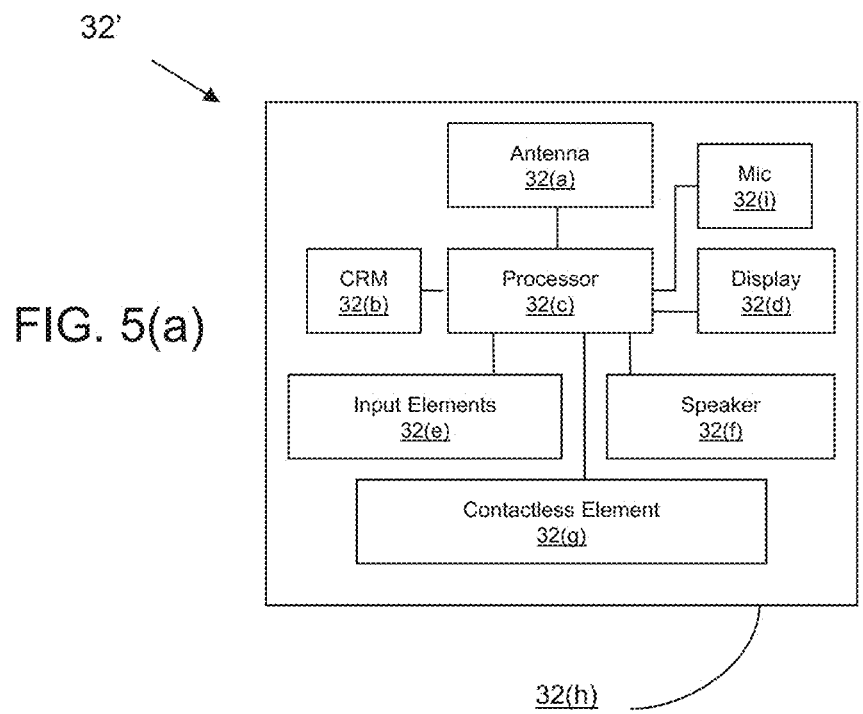
FIGS. 5(*a*)-5(*b*) show block diagrams of portable consumer devices.

FIGS. 5(*a*)-5(*b*) show block diagrams of portable consumer devices and subsystems that may be present in computer apparatuses in systems according to embodiments of the invention.

The portable consumer device that is used in embodiments of the invention may be in any suitable form. For example, suitable portable consumer devices can be hand-held and compact so that they can fit into a consumer's wallet and/or pocket (e.g., pocket-sized). They may include smart cards, payment cards, keychain devices (such as the Speedpass™ commercially available from Exxon-Mobil Corp.), etc. Other examples of portable consumer devices include wireless phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 32' in the form of a wireless phone may comprise a computer readable medium and a body as shown in FIG. 5(*a*). (FIG. 5(*a*) shows a number of components, and the portable consumer devices according to embodiments of the invention may comprise any suitable combination or subset of such components.) The computer readable medium 32(*b*) may be present within the body 32(*h*), or may be detachable from it. The body 32(*h*) may be in the form a plastic substrate, housing, or other structure. The computer readable medium 32(*b*) may be a memory that stores data and may be in any suitable form including a magnetic stripe, a memory chip, encryption algorithms, private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. In certain embodiments, the computer readable medium 32(*b*) can have the same or similar functionality as the memory element shown in FIG. 2.

Information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

Portable consumer device 32' may be used by a consumer to initiate transactions. Funds may be stored in computer readable medium 32(b), and communicated to an access device using contactless element 32(g), as described with reference to FIGS. 2-4. In some implementations, portable consumer device 32' can include an interface to allow the buyer to choose among various accounts containing prepaid funds. The portable consumer device 32' can then conduct a transaction or collect additional funds using contactless element 32(g) or over a wireless or wired communications.

Figure 5B:
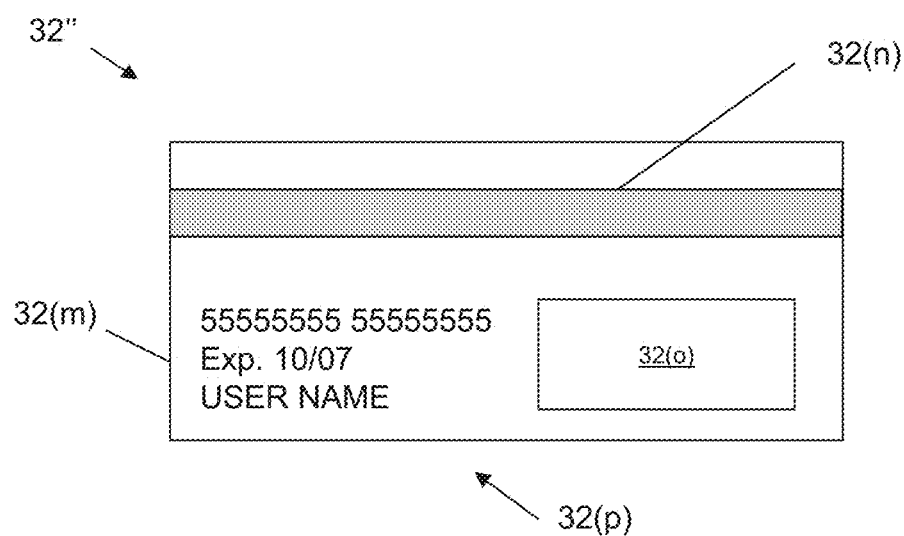

An example of a portable consumer device 32" in the form of a card is shown in FIG. 5(b). FIG. 5(b) shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 4(b), the portable consumer device 32" may include both a magnetic stripe 32(n) and a contactless element 32(o). In other embodiments, either the magnetic stripe 32(n) or the contactless element 32(o) may be present in the portable consumer device 32". In some embodiments, portable consumer device 32" may include a contact (i.e., non-wireless) element, for interfacing with external devices. The contact element may comprise one or more electrical contacts on the plastic substrate, or other suitable connection means.

Figure 6:
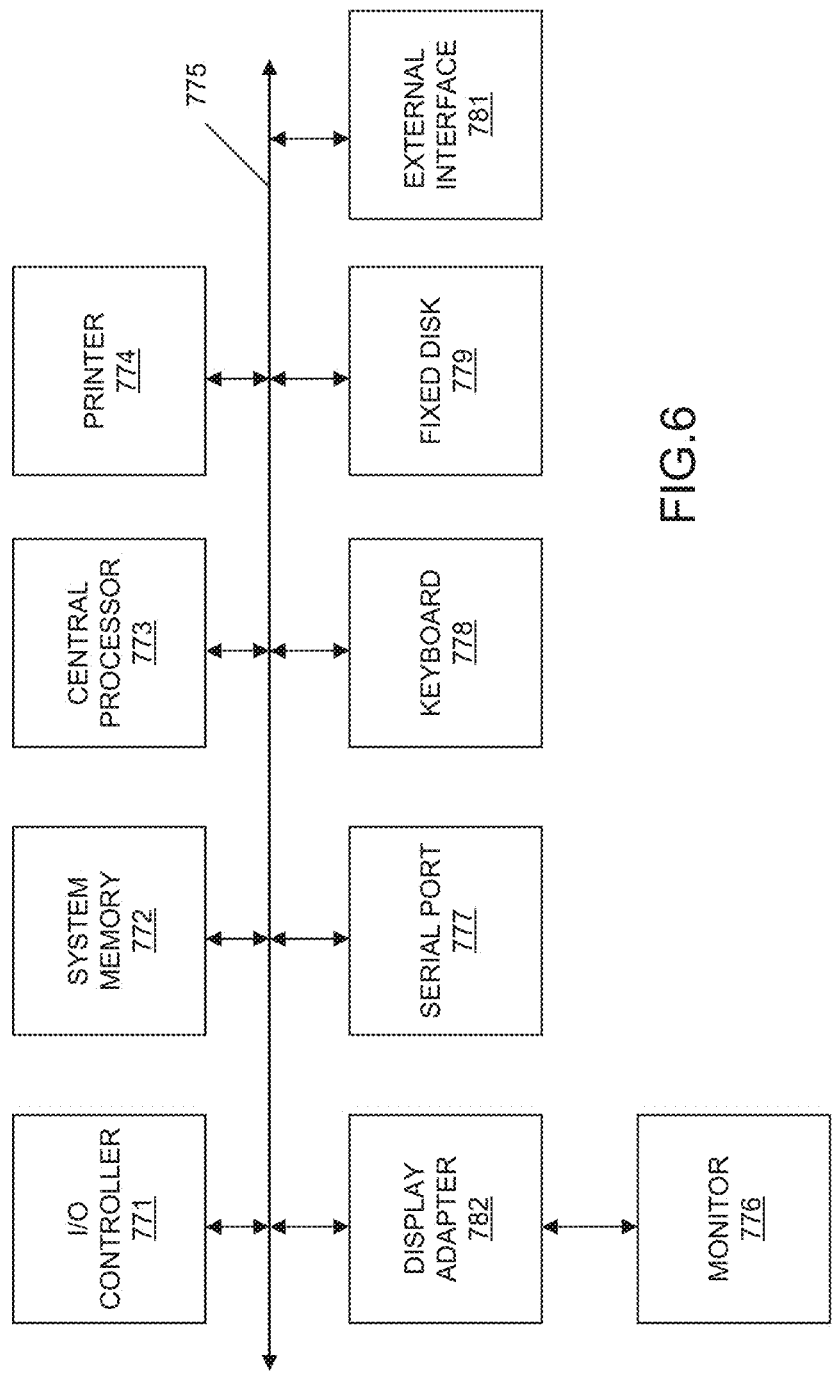
FIG. 6 shows a block diagram of a computer apparatus.

The various participants and elements in FIG. 1 may operate or use one or more computer apparatuses to facilitate the functions described herein. Any of the elements in FIG. 1 (e.g., the access device 34, the merchant 22, the acquirer 24, portable consumer device 32, etc.) may use any suitable number of subsystems to facilitate the functions described herein. Examples of such subsystems or components are shown in FIG. 6. The subsystems shown in FIG. 6 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. I/O controller 771 can comprise a processor or other suitable device. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Assembly, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

In certain implementations, a portable consumer device can be used in one or more (or two or more, etc.) transactions, and an accumulator record stored on the portable consumer device will be incremented to retain the value of the one or more (or two or more, etc.) initiated transactions. An exception record stored on the portable consumer device can be incremented to retain the value of one or more (or two or more, etc.) completed transactions. The accumulator record retains the value of the one or more (or two or more, etc.) initiated transactions, and the exception record retains the value of the one or more (or two or more, etc.) completed transactions, upon additional funds being collected on the portable consumer device. Thus, in some embodiments, the value of the accumulator record, the value of the exception record, and the value of the limit amount may never be reduced, only increased. The offline balance can be set by the difference between the accumulator record and the limit amount. In certain embodiments, the portable consumer device may never carry a negative balance. Thus, in certain embodiments, the accumulator record may not be greater than the limit amount, and the portable consumer device may only be used in transactions the consumer has the requisite funds for.

Embodiments of the invention contain a number of advantages. A portable consumer device can maintain a record of past transactions, and an offline balance, by storing three records—an accumulator record, exception record, and a card limit. The use of three separate records provides for a more complete transaction history while requiring relatively little data storage space on the portable consumer device. The accumulator record, exception record, and the card limit may not be reset, and can allow for the tracking of all purchases made with the card during its lifetime, and can allow for tracking of all funds added to the card during its lifetime. This is particularly useful in allowing the issuer or payment processing network to determine what, specifically, has happened with the card in various offline transactions (both initiated and completed). Furthermore, the offline balance is calculated from multiple data records stored in a memory on the portable consumer device. This makes the portable consumer device less accessible for fraudulent hacking (as two or more data records would need to be accessed and modified), and can also provide enhanced error correction.

Once an issuer has transmitted funds to be collected on a device, the issuer may not receive any communication from the portable consumer device for long periods of time. In such time periods, the portable consumer device may be used in multiple transactions. The issuer may not be alerted to such transactions (as these can be offline transactions) until a certain amount of time has elapsed (e.g., days, weeks, etc.). In prior art portable consumer devices, a record may have been stored that recorded whether there had been any exceptions during an offline transaction. However, this binary indicator (exception/no exception has occurred) made it difficult for the issuer to determine when the exception occurred, the extent of the exception, or if any funds were affected. Embodiments as disclosed herein can solve the above issues, as implementations of disclosed portable consumer devices can keep an exact record of initiated transactions (i.e., accumulator record), completed transactions (i.e., exception record), and collected funds (i.e., limit amount). This allows the issuer to clearly reconstruct the portable consumer device's offline transaction history, even when exceptions have occurred.

Furthermore, in some embodiments, a shadow copy of the data on the portable consumer device can be stored remotely (e.g. in a server or other networked storage database) by the issuer or the payment processing network. This shadow copy can provide another layer of fraud and error prevention by providing a backup of the data on the portable consumer device.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

In certain embodiments, any of the software components, method steps, or functions described in this application and performed by the issuer, payment processing network, acquirer, consumer, merchant, etc., may be implemented as software code to be executed by a processor using any suitable computer language. Examples of suitable computer language can include, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computer such as a server computer, and may be present on or within different computers within a system or network.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method for processing a transaction with a transaction card, the transaction having a value, the method comprising:
    retrieving, using a processor from a memory of the transaction card, a value of an accumulator record stored in the memory of the transaction card;
    wherein retrieving the value of the accumulator record automatically increments the accumulator record by the value of the transaction upon initiation of the transaction;
    sending, by the processor to an issuer associated with the transaction card, an authorization request message requesting authorization for the transaction;
    receiving, by the processor from the issuer, an authorization response message indicating whether the transaction is authorized or declined;
    retrieving, using the processor from the memory of the transaction card, a value of an exception record stored in the memory of the transaction card when the authorization response message indicates that the transaction is authorized;
    wherein the exception record is incremented by the value of the transaction only upon successful completion of the transaction, the exception record stored in the memory of the transaction card is not incremented when the transaction fails, the accumulator record and the exception record illustrate a record of past transactions associated with the transaction card; and
    transmitting, using the processor, the accumulator record and the exception record to the issuer for determining that the past transactions include an exception if there is a difference between the accumulator record and the exception record stored in the memory of the transaction card.

2. The method of claim 1, further comprising:
determining, using the processor, a value of a limit amount stored in a memory of the transaction card;
identifying the issuer associated with the transaction card;
wherein the authorization request message includes the value of the limit amount, the value of the exception record, and the value of the accumulator record;
wherein the authorization response message includes an amount of additional funds to be collected on the transaction card; and
incrementing the limit amount for the transaction card by the amount of additional funds,
wherein the incrementing of the exception record occurs after receiving the authorization response message.

3. The method of claim 2, wherein the incrementing of the accumulator record occurs prior to receiving the authorization response message.

4. The method of claim 2, wherein a difference between the limit amount and the accumulator record comprises an offline balance for the transaction card.

5. The method of claim 4, further comprising, prior to sending the authorization request message for the transaction to the issuer:
determining that the offline balance of the transaction card is less than the value of the transaction.

6. The method of claim 4, wherein the amount of additional funds is equal to or greater than a difference between the value of the transaction and the offline balance of the transaction card.

7. The method of claim 1, further comprising:
determining, prior to incrementing the exception record by the value of the transaction, that the transaction is successfully completed.

8. An access device comprising:
a processor; and
a computer-readable storage medium coupled to the processor, the computer-readable storage medium comprising code executable by the processor for executing a method for processing a transaction with a transaction card, the transaction having a value, the method comprising:
retrieving, from a memory of the transaction card, a value of an accumulator record stored in the memory of the transaction card;
wherein retrieving the value of the accumulator record automatically increments the accumulator record by the value of the transaction upon initiation of the transaction;
sending, by the processor to an issuer associated with the transaction card, an authorization request message requesting authorization for the transaction;
receiving, by the processor from the issuer, an authorization response message indicating whether the transaction is authorized or declined;
retrieving, from the memory of the transaction card, a value of an exception record stored in the memory of the transaction card when the authorization response message indicates that the transaction is authorized;
wherein the exception record is incremented by the value of the transaction only upon successful completion of the transaction, the exception record stored in the memory of the transaction card is not incremented when the transaction fails, the accumulator record and the exception record illustrate a record of past transactions associated with the transaction card; and
transmitting, using the processor, the accumulator record and the exception record to the issuer for determining that the past transactions include an exception if there is a difference between the accumulator record and the exception record stored in the memory of the transaction card.

9. The access device of claim 8, wherein the method further comprises:
determining a value of a limit amount stored in a memory of the transaction card;
identifying the issuer associated with the transaction card;
wherein the authorization request message includes the value of the limit amount, the value of the exception record, and the value of the accumulator record;
wherein the authorization response message includes an amount of additional funds to be collected on the transaction card; and
incrementing the limit amount for the transaction card by the amount of additional funds,
wherein the incrementing of the exception record occurs after receiving the authorization response message.

10. The access device of claim 9, wherein the incrementing of the accumulator record occurs prior to receiving the authorization response message.

11. The access device of claim 9, wherein a difference between the limit amount and the accumulator record comprises an offline balance for the transaction card.

12. The access device of claim 11, wherein the method further comprises, prior to sending the authorization request message for the transaction to the issuer:
determining that the offline balance is greater than or equal to the value of the transaction.

13. The access device of claim 11, wherein the amount of additional funds is equal to or greater than a difference between the value of the transaction and the offline balance of the transaction card.

14. The access device of claim 8, wherein the method further comprises:
determining, prior to incrementing the exception record by the value of the transaction, that the transaction is successfully completed.

* * * * *